(12) United States Patent
Wetzel et al.

(10) Patent No.: US 7,155,049 B2
(45) Date of Patent: Dec. 26, 2006

(54) SYSTEM FOR CREATING MICROSCOPIC DIGITAL MONTAGE IMAGES

(75) Inventors: Arthur W. Wetzel, Murrysville, PA (US); John R. Gilbertson, II, Pittsburgh, PA (US); Jeffrey A. Beckstead, Valencia, PA (US); Patricia A. Feineigle, Pittsburgh, PA (US); Christopher R. Hauser, Pittsburgh, PA (US); Frank A. Palmieri, Jr., Gibsonia, PA (US)

(73) Assignee: Trestle Acquisition Corp., Irvine, CA (US)

( * ) Notice: Subject to any disclaimer, the term of this patent is extended or adjusted under 35 U.S.C. 154(b) by 878 days.

(21) Appl. No.: 09/919,452

(22) Filed: Jul. 31, 2001

(65) Prior Publication Data

US 2002/0090127 A1   Jul. 11, 2002

Related U.S. Application Data

(63) Continuation-in-part of application No. 09/757,703, filed on Jan. 11, 2001, now Pat. No. 6,798,571, and a continuation-in-part of application No. 09/758,037, filed on Jan. 11, 2001, now Pat. No. 6,993,169, and a continuation-in-part of application No. 09/788,666, filed on Feb. 21, 2001, now Pat. No. 6,816,606.

(51) Int. Cl.
*G06K 9/00* (2006.01)

(52) U.S. Cl. .................... 382/133; 382/168; 378/43

(58) Field of Classification Search ........ 382/128–134, 382/164, 165, 168–172, 181, 252, 255, 263, 382/380, 162, 203, 209, 219, 224, 243, 260, 382/274, 275, 276, 285, 295, 299, 305, 308, 382/318; 378/23, 28, 46, 98.9, 43, 98.6; 348/34, 68, 79, 269; 356/38, 39; 250/339.11, 250/370.09; 359/24; 377/10
See application file for complete search history.

(56) References Cited

U.S. PATENT DOCUMENTS

| | | | |
|---|---|---|---|
| 3,999,047 A | 12/1976 | Green | 235/151.3 |
| 4,136,950 A | 1/1979 | Labrum et al. | |
| 4,150,360 A | 4/1979 | Kopp et al. | 340/146.3 |
| 4,199,748 A | 4/1980 | Bacus | 340/146.3 |
| 4,213,036 A | 7/1980 | Kopp et al. | 235/92 |
| 4,523,278 A | 6/1985 | Reinhardt et al. | 364/413 |
| 4,742,558 A | 5/1988 | Ishibashi et al. | 382/56 |
| 4,779,151 A | 10/1988 | Lind et al. | 360/92 |
| 4,965,725 A | 10/1990 | Rutenberg | 364/413.1 |
| 5,068,906 A | 11/1991 | Kosaka | 382/48 |
| 5,072,382 A | 12/1991 | Kamentsky | 364/413.08 |
| 5,073,857 A * | 12/1991 | Peters et al. | 382/133 |
| 5,099,521 A | 3/1992 | Kosaka | 382/6 |
| 5,107,422 A | 4/1992 | Kamentsky et al. | 364/413.08 |
| 5,123,056 A | 6/1992 | Wilson | 382/6 |
| 5,143,193 A | 9/1992 | Geraci | 194/212 |
| 5,149,972 A | 9/1992 | Fay et al. | |
| 5,163,095 A | 11/1992 | Kosaka | 382/6 |
| 5,216,500 A | 6/1993 | Krummey et al. | 358/93 |
| 5,216,596 A * | 6/1993 | Weinstein | 348/79 |
| 5,218,645 A | 6/1993 | Bacus | 382/6 |
| 5,252,487 A | 10/1993 | Bacus et al. | 436/63 |
| 5,257,182 A | 10/1993 | Luck et al. | 364/413.1 |
| 5,260,871 A | 11/1993 | Goldberg | 364/413.02 |
| 5,268,966 A | 12/1993 | Kasdan | 382/6 |
| 5,287,272 A | 2/1994 | Rutenberg et al. | 364/413.01 |
| 5,297,034 A | 3/1994 | Weinstein | 364/413.02 |
| 5,313,532 A | 5/1994 | Harvey et al. | 382/15 |
| 5,333,207 A | 7/1994 | Rutenberg | 382/6 |
| 5,363,258 A | 11/1994 | Coles et al. | 360/92 |
| 5,381,224 A | 1/1995 | Dixon et al. | |

| | | | |
|---|---|---|---|
| 5,428,690 A | 6/1995 | Bacus et al. ............... 382/128 |
| 5,471,561 A | 11/1995 | Cowgill et al. .............. 395/82 |
| 5,473,706 A | 12/1995 | Bacus et al. ............... 382/133 |
| 5,499,097 A | 3/1996 | Ortyn et al. ................ 356/372 |
| 5,505,946 A | 4/1996 | Kennedy et al. ......... 424/195.1 |
| 5,544,650 A | 8/1996 | Boon et al. ................. 128/632 |
| 5,544,996 A | 8/1996 | Castaldi et al. ............. 414/280 |
| 5,592,313 A * | 1/1997 | Hart ........................... 359/24 |
| 5,625,765 A | 4/1997 | Ellenby et al. ............. 395/135 |
| 5,636,425 A | 6/1997 | Best ........................... 29/407.04 |
| 5,638,459 A | 6/1997 | Rosenlof et al. |
| 5,647,025 A * | 7/1997 | Frost et al. ................. 382/255 |
| 5,680,694 A | 10/1997 | Best ........................... 29/701 |
| 5,687,251 A | 11/1997 | Erler et al. ................. 382/133 |
| 5,700,125 A | 12/1997 | Falace et al. ............... 414/276 |
| 5,740,270 A | 4/1998 | Rutenberg et al. |
| 5,768,125 A | 6/1998 | Zinger et al. .......... 364/167.01 |
| 5,784,162 A | 7/1998 | Cabib et al. ................ 356/346 |
| 5,796,861 A | 8/1998 | Vogt et al. .................. 382/128 |
| 5,835,620 A | 11/1998 | Kaplan et al. .............. 382/133 |
| 5,838,837 A | 11/1998 | Hirosawa et al. ........... 382/284 |
| 5,848,177 A | 12/1998 | Bauer et al. ................ 382/128 |
| 5,875,258 A * | 2/1999 | Ortyn et al. ................ 382/133 |
| 5,878,152 A | 3/1999 | Sussman |
| 5,912,699 A | 6/1999 | Hayenga et al. |
| 5,933,519 A | 8/1999 | Lee et al. ................... 382/133 |
| 6,014,451 A | 1/2000 | Berry et al. |
| 6,031,930 A | 2/2000 | Bacus et al. ............... 382/133 |
| 6,049,421 A | 4/2000 | Raz et al. |
| 6,081,612 A | 6/2000 | Gutkowicz-Krusin et al. ........................... 382/128 |
| 6,091,842 A | 7/2000 | Domanik et al. |
| 6,101,265 A | 8/2000 | Bacus et al. ............... 382/133 |
| 6,151,405 A * | 11/2000 | Douglass et al. ........... 382/133 |
| 6,172,349 B1 | 1/2001 | Katz et al. |
| 6,226,392 B1 | 5/2001 | Bacus et al. |
| 6,272,235 B1 * | 8/2001 | Bacus et al. ............... 382/133 |
| 6,498,006 B1 | 12/2002 | Wong |
| 6,545,265 B1 | 4/2003 | Czarnetzki et al. |
| 6,674,879 B1 * | 1/2004 | Weisman et al. .......... 382/128 |
| 6,711,283 B1 * | 3/2004 | Soenksen .................... 382/133 |

FOREIGN PATENT DOCUMENTS

| | | |
|---|---|---|
| DE | 3922358 A1 | 1/1991 |
| DE | 199 23 821 A1 | 11/2000 |
| EP | 0 557 558 A1 | 9/1993 |
| GB | 1 404 628 | 9/1975 |
| JP | 11097342 | 4/1999 |
| WO | WO 92/13308 | 8/1992 |
| WO | WO 93/14954 | 8/1993 |
| WO | WO 97/04347 | 2/1997 |
| WO | WO 97/20198 | 6/1997 |
| WO | WO 98/39728 | 9/1998 |
| WO | WO 01/37192 | 5/2001 |
| WO | WO 01/61626 | 8/2001 |

OTHER PUBLICATIONS

Weaver B A et al: "Performance of the Ultraheavy Collector of the Trex Experiment" Nuclear Instruments & Methods In Physics Research Section B, Nov. 1998, pp. 409-428, vol. 145, No. 3, Northo-Holland Publishing Co. Amsterdam, NL.

"An Efficient Method for Automated Segmentation of Histochemically Stained Slides", Gaddipati et al., IEEE-EMBC and CMBEC (1995).

"Automatic Threshold Selection Using Histogram Quantization", Wang et al., Journal of BioMedical Optics, vol. 2, No. 2 (Apr. 1997).

"FSED-Feature Selective Edge Detection", Borga et al. (2000).

Illumea Product Group Internet Page <http://www/illumea.com/800-823-3203/products/>.

"Biomarkers of Premalignant Breast Disease and Their Use as Surrogate Endpoints in Clinical Trials of Chemopreventive Agents", Boone et al., The Breast Journal, vol. 1, No. 4 (1995).

"Development of Breast Cancer Chemopreventive Drugs", Kelloff et al., Journal of Cellular Biochemistry, 17G:2-13 (1993).

"Development of Surrogate Endpoint Biomakers for Clinical Trials of Cancer Chemopreventive Agents: Relationships to Fundamental Properties of Preinvasive (Intraepithelial) Neoplasia", Boone et al., Journal of Cellular Biochemistry, Supplement 19:10-22 (1994).

"Markovian Analysis of Cervical Cell Images", Norman J. Pressman, The Journal of Histochemistry and Cytochemistry, vol. 24., No. 1, pp. 138-144 (1976).

"Quantiation Preinvasive Neoplastic Progression in Animal Models of Chemical Carcinogenesis", Bacus et al., Journal of Cellular Biochemistry Supplements 28/29:21-38 (1997).

"Analytical Quantitative Cycology and Hiscology", Chromatin Texture Measurement by Markovian Analysis, Dawson et al.

"The Image Processing Handbook", John C. Russ—2nd ed.

"Segmentation of Mammograms Using Multiple Linked Self-Organizing Neural Networks", Dance et al., Med. Phys. 22(2) (Feb. 1995).

"Hough Spectrum Geometric Feature Analysis", Zhang et al.

"Cervical Cell Recognition and Morphometric Grading by Image Analysis", James W. Bacus, Journal of Cellular Biochemistry, Supplement 23:33-42 (1995).

"Detection and Characterization of Microcalcifications in Mammographic Images", Pereira et al.

* cited by examiner

Primary Examiner—Kanjibhai Patel
Assistant Examiner—Seyed Azarian
(74) Attorney, Agent, or Firm—Richard W. James

(57) ABSTRACT

An imaging apparatus is disclosed. The imaging apparatus includes a motorized stage, a camera focussed relative to the stage, and a processor coupled to the camera. The processor contains instructions which, when executed by the processor, cause the processor to capture an image incident on the camera, convert the image into a plurality of pixels having a characteristic such as intensity, establish the characteristic for each pixel; and determine which pixels contain a target image based on the characteristic of the pixels. Another imaging apparatus includes a motorized stage, a camera having a lens directed toward the motorized stage, and a processor coupled to the camera. The processor contains instructions which, when executed by the processor, cause the processor to select at least three regions of a sample adjacent the motorized stage, develop a focus surface based on a normalized distribution of the at least three selected regions, position the camera on a region of the sample, focus the camera on the surface, and capture an image of the region. In addition, an imaging apparatus having a motorized stage, a camera focussed relative to the motorized stage, a stage position sensor adjacent the motorized stage, and a pulsed light directed toward the motorized stage and coupled to the stage position sensor such that the pulsed light illuminates in response to the stage position sensor is disclosed.

58 Claims, 10 Drawing Sheets
(2 of 10 Drawing Sheet(s) Filed in Color)

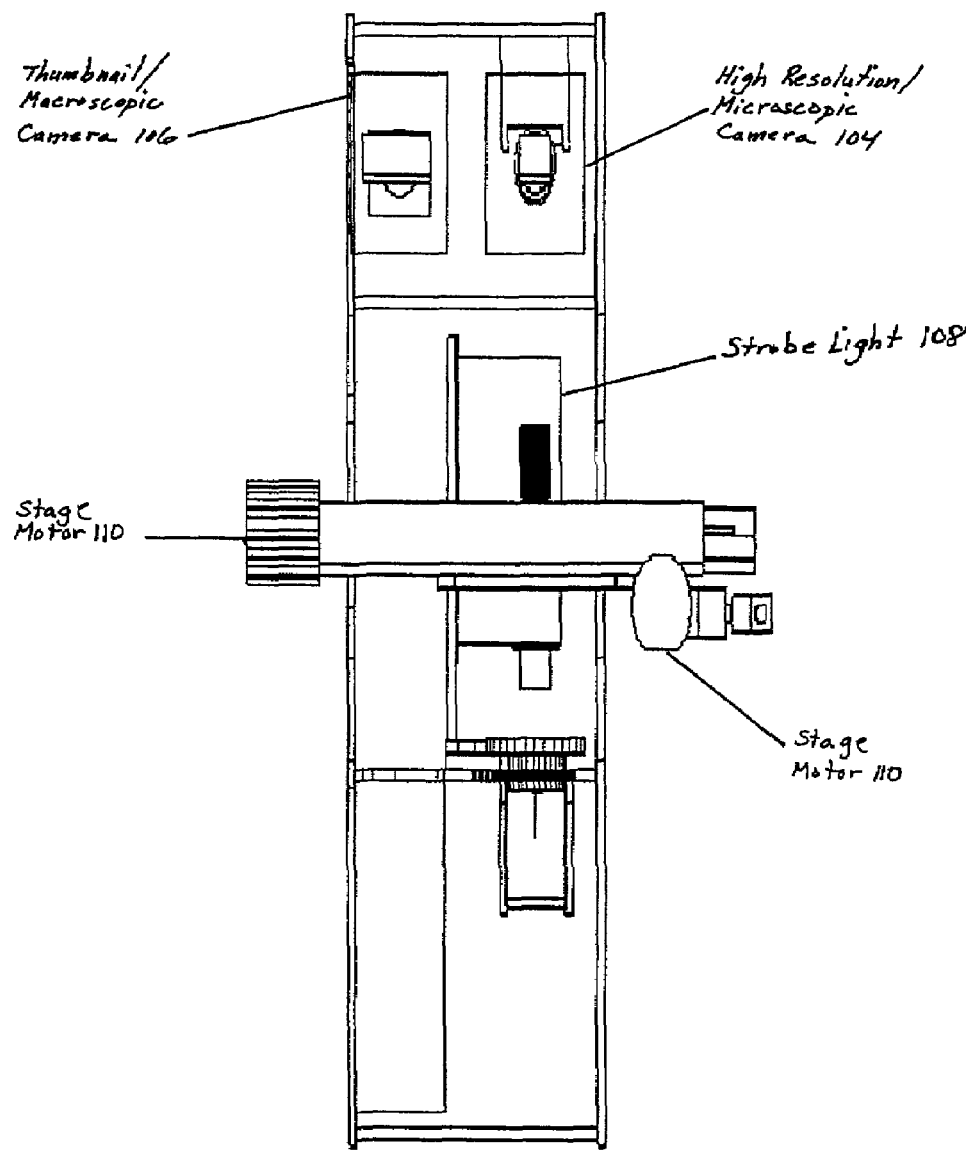

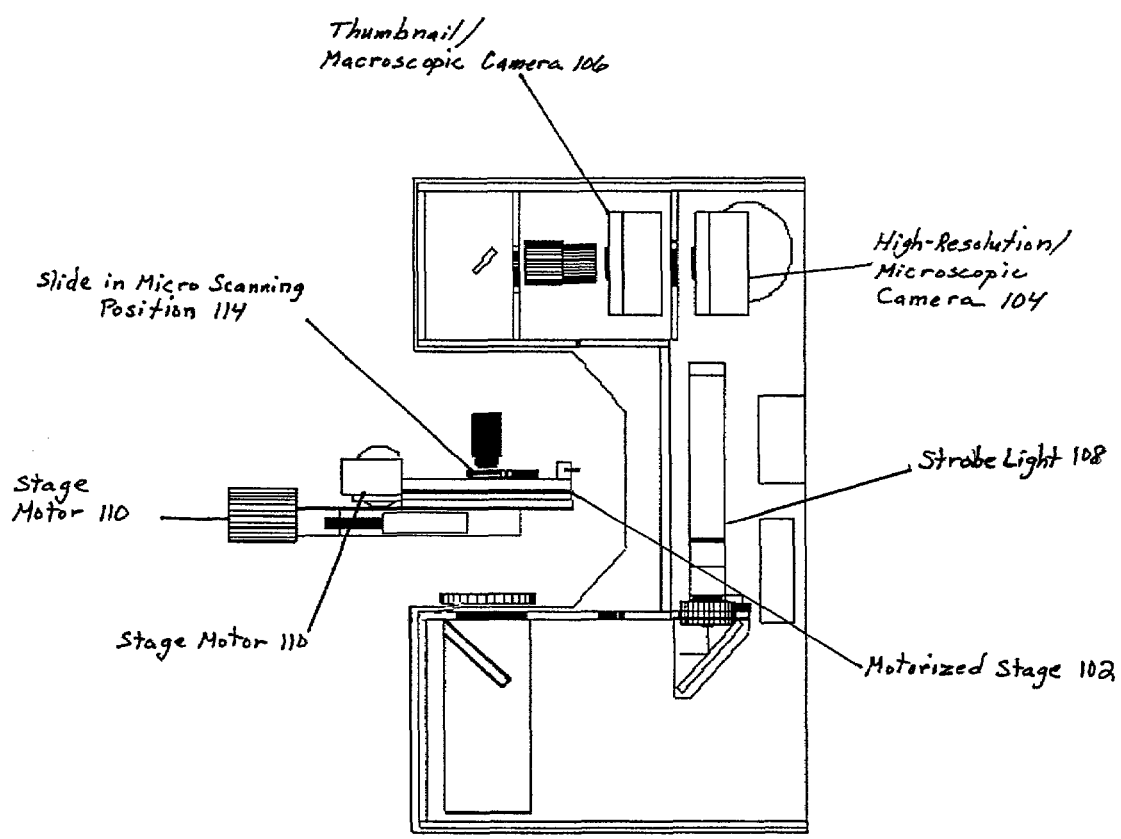

Representative focus positions

| x-position | y-position | z-position | error from fit |
|---|---|---|---|
| -320579 | -220388 | 13640 | -16.8701 |
| -345974 | -193300 | 13510 | -1.22168 |
| -354439 | -206844 | 13540 | 18.5000 |
| -320579 | -178063 | 13540 | -6.56836 |
| -295184 | -196686 | 13660 | -10.1563 |
| -297300 | -186528 | 13630 | -7.42969 |
| -286719 | -193300 | 13660 | -26.3506 |
| -295184 | -215309 | 13720 | 1.31152 |
| -267672 | -205151 | 13790 | 16.4717 |
| -329044 | -220388 | 13610 | -21.8516 |
| -343857 | -206844 | 13560 | 7.22461 |
| -305765 | -220388 | 13730 | 29.3477 |
| -350206 | -220388 | 13560 | -9.30664 |
| -278254 | -210230 | 13760 | 4.51074 |
| -316346 | -181449 | 13590 | 22.0967 |

Best fit is planar with parameters:

Resulting Position vs. Strobe Pulse

SYSTEM FOR CREATING MICROSCOPIC DIGITAL MONTAGE IMAGES

CROSS-REFERENCE TO RELATED APPLICATIONS

The present application is a continuation-in-part of U.S. patent application Ser. No. 09/757,703, filed Jan. 11, 2001 now U.S. Pat. No. 6,798,571, U.S. patent application Ser. No. 09/758,037, filed Jan. 11, 2001 now U.S. Pat. No. 6,993,169, and U.S. patent application Ser. No. 09/788,666, filed Feb. 21, 2001 now U.S. Pat. No. 6,816,606, all of which are currently pending and assigned to the assignee of the present invention.

FIELD OF THE INVENTION

The present invention relates to microscopic digital imaging of complete tissue sections for medical and research use. In particular, it describes a method for high throughput montage imaging of microscope slides using a standard microscope, digital video cameras, and an illumination system.

BACKGROUND OF THE INVENTION

Laboratories in many biomedical specialties, such as anatomic pathology, hematology, and microbiology, examine tissue under a microscope for the presence and the nature of disease. In recent years, these laboratories have shown a growing interest in microscopic digital imaging as an adjunct to direct visual examination. Digital imaging has a number of advantages including the ability to document disease, share findings, collaborate (as in telemedicine), and analyze morphologic findings by computer. Though numerous studies have shown that digital image quality is acceptable for most clinical and research use, some aspects of microscopic digital imaging are limited in application.

Perhaps the most important limitation to microscopic digital imaging is a "sub-sampling" problem encountered in all single frame images. The sub-sampling problem has two components: a field of view problem and a resolution-based problem. The field of view problem limits an investigator looking at a single frame because what lies outside the view of an image on a slide cannot be determined. The resolution-based problem occurs when the investigator looking at an image is limited to viewing a single resolution of the image. The investigator cannot "zoom in" for a closer examination or "zoom out" for a bird's eye view when only a single resolution is available. Significantly, the field of view and resolution-based problems are inversely related. Thus, as one increases magnification to improve resolution, one decreases the field of view. For example, as a general rule, increasing magnification by a factor of two decreases the field of view by a factor of four.

To get around the limitations of single frame imaging, developers have looked at two general options. The first option takes the form of "dynamic-robotic" imaging, in which a video camera on the microscope transmits close to real time images to the investigator looking at a monitor, while the investigator operates the microscope by remote control. These systems have been used successfully in initial telepathology collaborations by allowing a distant consultant to view the specimen without the delays and losses associated with sending the physical slide to the consultant for review, and by allowing the consultant to view the entire slide, not just a few static images captured by the initial user.

However, these systems do not lend themselves to significant collaborations, documentation or computer based analysis. To be successful, remote transmission requires lossy video compression techniques to be used in order to meet the network bandwidth requirements, or requires significant delays in the image display if lossless transmission is used. In addition, lossy compression on the order required for real-time remote transmission, severely limits computer-based analysis, as well as human diagnosis, due to the artifacts associated with lossy compression techniques. Remote operation of a microscope also requires only a single user to use the instrument at one time, requiring instrument scheduling and local maintenance of the instrument and the slides to be viewed.

The second option being investigated to overcome the limitations inherit in single frame imaging is a montage (or "virtual slide") approach. In this method, a robotic microscope systematically scans the entire slide, taking an image at each "camera field" corresponding to the field of view of the camera. Camera field and field of view shall hereinafter be referred to as the "field." The individual images are then "knitted" together in a software application to form a very large data set with very appealing properties. The robotic microscope can span the entire slide area at a resolution limited only by the power of the optical system and camera. Software exists to display this data set at any resolution on a computer screen, allowing the user to zoom in, zoom out, and pan around the data set as if using a physical microscope. The data set can be stored for documentation, shared over the Internet, or analyzed by computer programs.

The "virtual slide" option has some limitations, however. One of the limitations is file size. For an average tissue section, the data generated at 0.33 µm/pixel can be between two and five gigabytes uncompressed. In an extreme case, the data generated from one slide can be up to thirty-six gigabytes.

A much more difficult limitation with the prior systems is an image capture time problem. Given an optical primary magnification of twenty and a two-third inch coupled device or "CCD", the system field of view is approximately (8.8 mm×6.6 mm)/20=0.44×0.33 mm. A standard tissue section of approximately 2.25 square centimeters, therefore, requires approximately fifteen hundred fields to capture an image of the entire tissue section.

Field rate, which is the amount of time it takes to capture an image of a field and set-up the apparatus capturing the field for a following image capture, in montage systems is limited by three factors—camera frame rate (the number of camera images acquired per second), image processing speed (including any time required to read the camera data, perform any processing on the camera data prior to storage, and to store the final data), and rate of slide motion, which is the time required for the slide to be mechanically repositioned for the next image acquisition. Given today's technology, the rate of slide motion is a significant limiting factor largely because the existing imaging systems require the slide to come to a stop at the center of each field to capture a blur free image of the field.

For example, traditional bright field microscopic illumination systems were designed to support direct visual examination of a specimen on the field and therefore depend on a continuous light source for illumination. Continuous light, however, is a significant limitation for digital imaging in that the slide, which must move to capture an entire image, but must be stationary with respect to the camera during CCD integration, thus moving the slide from the light. Moreover, slide motion during integration results in a blurred image.

Traditional montage systems, therefore, have had to move the slide (and stage) from field to field in a precise "move, stop, take image and move again" pattern. This pattern requires precise, expensive mechanics, and its speed is inherently limited by the inertia of the stage.

The three-dimensional characteristic of a typical tissue sample and the slide places additional limitations on the imaging system. Like all lenses, microscope optics have a finite depth of field—the distance within which objects will appear to be focused. A typical depth of field is about 8 microns for a 10× objective, and in general, as the magnification increases, the depth of field decreases. While microscope slides are polished glass, the flatness of the slide can vary on the order of 50 microns or more across the slide. The variations in the tissue sample thickness and any defects associated with placing the sample on the slide, such as folds in the tissue, also affect the optimal position of the slide with respect to the imaging optics. The magnitude of the optimal position and the limited depth of field of the microscope optics require the focus to be adjusted as the system moves from field to field. The time to refocus the system at each field also contributes to the overall capture time of the montage image.

Thus, a system is needed to reduce the image capture time. The system must also enable efficient and high quality imaging of a microscope slide via a high-resolution slide scanning process.

SUMMARY OF THE INVENTION

The present invention relates to a method and system for creating a high throughput montage image of microscope slides. The system includes an optical system, components that are used in a pre-scan processing, and components for auto-focusing by enabling accurate focus control of optical elements without requiring the stage to be stopped and refocused at each tile location. The optical system includes at least one camera, a motorized stage for moving a slide while an image of the slide is captured, a pulsed light illumination system that optically stops motion on the motorized stage while allowing continuous physical movement of the motorized stage, and a stage position detector that controls firing of the pulsed light illumination system at predetermined positions of the motorized stage. The components that are used in the pre-scan processing include an image-cropping component, a tissue finding component and a scan control component. The image-cropping component and tissue finding component identify tissue regions on the slide in the optical system and determine exact locations of tissue on the slide. The scan control component uses information about the locations to generate control parameters for the motorized stage and the camera. The components for auto-focusing include a focal point selection component, a focal surface determination component, and a scan component. The focal point selection component and the focal surface determination component use the control parameters to ensure that a high-quality montage image is captured. The scan component is able to capture a high-quality montage image by maintaining motion of the motorized stage and synchronization of the optical system. The scan component controls the stage position to maintain in-focus imaging during the scanning process without stopping the stage and refocusing at each location and fires a pulsed-illumination source at the appropriate position to guarantee image alignment between sequential camera images.

Accordingly, it is a benefit of the invention that it provides a microscopic imaging system for whole slide montage in which standard microscope optics, off the shelf cameras, a simple motorized stage, and a pulse light illumination system can be used to produce precisely aligned image tiles, and acquire these image tiles at a speed limited primarily by the camera frame rate.

The present invention uses a strobe light, triggered by a direct Ronchi ruler or other stage-positioning device, to produce precisely aligned image tiles that can be made into a montage image of tissue sections on a microscope slide. Significantly, due to the short light pulse emitted by a strobe, clear images can be obtained without stopping the microscope stage. This significantly increases the image throughput while decreasing the expense and precision required in the stage mechanics.

In one embodiment, a strobe arc is placed at the position of the lamp bulb in a standard microscope system. The camera shutter is opened and the strobe is fired in response to the position of the stage as reported by a direct position sensor. If stray light is minimized, the camera exposure can be much longer than the strobe flash, allowing low cost cameras to be utilized.

It is another benefit of the invention to significantly increase the image throughput of a tiling image system by allowing, through the use of the strobe light, continuous motion of the slide under the microscope. The inventive system thus eliminates the need to stop the microscope stage to capture an image.

It is another benefit of the invention to reduce the demands of camera, stage, and strobe synchronization by controlling the firing of the strobe light based on direct stage position feedback, thereby substantially reducing the mechanical precision required of the stage and camera components.

It is another benefit of the invention to use a pre-scan process applied to a macroscopic image of the entire slide, to guide a high-resolution slide scanning process and ensure high-quality images of the entire specimen are acquired. The pre-scan process includes an image cropping component, a tissue finding component, a scan control component, a focus point selection component, a focal surface determination component, and a scan component. The image cropping and tissue finding components identify interesting regions on the slide to be scanned. The focus point selection and focal surface determination components ensure that a high quality image is captured by the scanning process, by enabling accurate focus control to be maintained.

It is another benefit of the invention to use a high-resolution slide scanning process to control the operation of the motorized stage, camera and strobe illumination. This process utilizes information gathered by the pre-scan process, namely the imaging regions and focus parameters, to control the positioning of the stage to image only the regions of interest and to ensure the individual images are well aligned and in focus.

Additional features and advantages of the invention will be apparent from the description that follows, or may be learned by practice of the invention. The objectives and advantages of the invention to be realized and attained by the microscopic image capture system will be pointed out in the written description and claims hereof as well as the appended drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of the invention and are incorporated in and constitute a part of this specification, illustrate embodiments of the invention that together with the description serve to explain the principles of the invention.

FIG. 1a is a front view of the apparatus of FIG. 1;

FIG. 1b is a side view of the apparatus of FIG. 1;

FIG. 6 is a generated three-dimensional data set for the image of FIG. 5; and

DESCRIPTION OF THE PREFERRED EMBODIMENTS

Reference will now be made in detail to the preferred embodiments of the present invention, examples of which are illustrated in the accompanying drawings. The following paragraphs describe the functionality of the inventive system and method for focus controlled, high throughput montage imaging of microscope slides using a standard microscope, camera, and a motorized mechanical stage.

Figure 1:
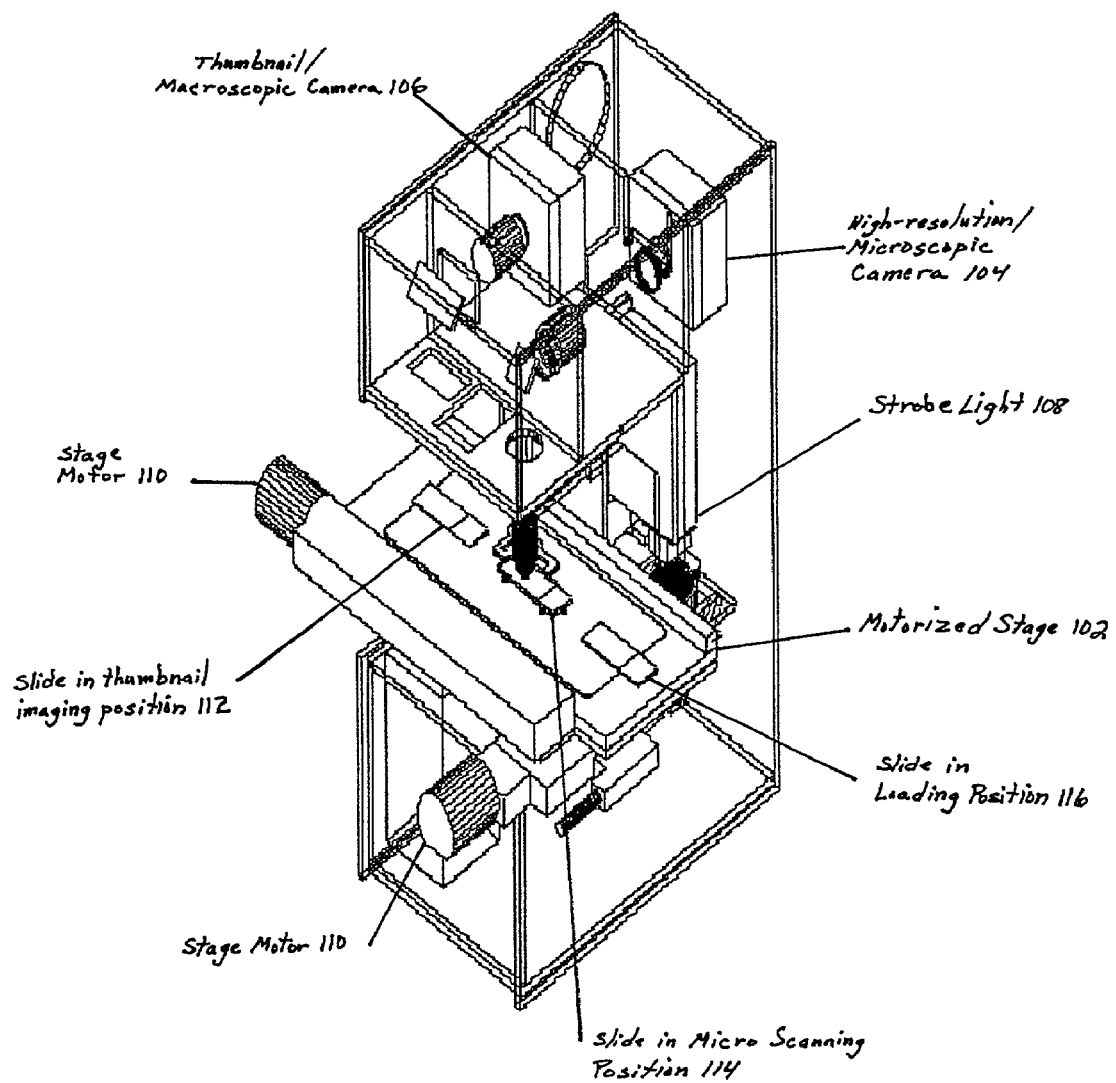
FIG. 1 is a partial isometric view of an embodiment of an imaging apparatus of the present invention.
Figure 1C:
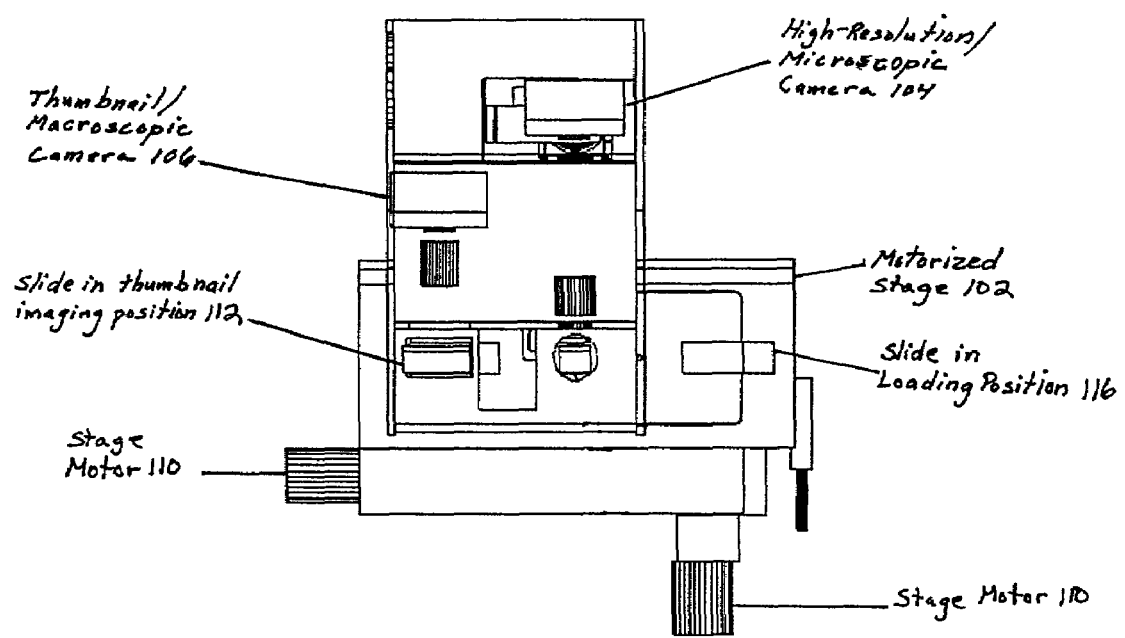
FIG. 1c is a top view of the apparatus of FIG. 1.

FIG. 1 illustrates a first embodiment of the imaging apparatus of the present invention. FIGS. 1a–1c illustrate front, side, and top views, respectively, of the imaging apparatus illustrated in FIG. 1. It should be noted that not all components that may be included in an imaging apparatus are illustrated in FIGS. 1–1c. For example, a stage support that attaches the stage to the imaging apparatus is not illustrated so as not to obstruct the view of other components. In this embodiment, a slide 112 to be imaged is placed on a thumbnail imaging position in a slide holder on a motorized stage 102. A single frame image containing the entire slide may be taken with a macro camera 106. One skilled in the art will recognize, however, that a suitable image may alternately be captured by combining multiple images taken by a microscopic camera such as microscopic camera 104. Microscopic and macroscopic images may furthermore be captured by use of two separate cameras or through the use of a single camera. The low-resolution image may be analyzed by software components, described below, to determine the locations of tissue on slide 112. This information can then be used to generate control parameters for stage 102 and microscopic camera 104 to ensure that the scanning process captures high quality images of only the tissue regions, substantially reducing the time to scan an average slide.

One skilled in the art will recognize that, although capturing the single macroscopic image saves time, it is not necessary for the operation of the invention. However, where a macroscopic image is to be used, multiple macroscopic images may be required to generate control parameters to the accuracy required based on the ratio of the macroscopic to microscopic magnifications and the camera specifications of each camera, if separate cameras are utilized.

Once the regions to be microscopically imaged are identified, the slide is scanned under the microscope optics. To facilitate rapid imaging of the slide and to avoid the stop image reposition delays associated with traditional imaging systems, a high-speed strobe light is used to optically stop the motion of the stage, thus the slide specimen, while allowing continuous stage motion. It should be apparent to one skilled in the art, that any pulsed illumination system may be used in place of the high-speed strobe light. To eliminate overlap or missed tissue between the microscope images, precise alignment of the stage and camera, along with accurate stage positioning, and camera and strobe synchronization, are required. To reduce the camera precision requirements, a direct stage position sensor is used to control the firing of the strobe, and thus the camera exposure.

In this fashion, the camera can be operated with a long exposure window in comparison to the very short strobe flash, allowing lower cost components, specifically the stage and camera, to be utilized.

Specifically in an embodiment illustrated in FIGS. 1–1c, a pre-scan processing of the low-resolution or thumbnail image includes an image cropping component, a tissue finding component, a scan control component, a focus point selection component, and a focal surface determination component. Those pre-scanning components may then be followed by a scan component. The image cropping component and tissue finding component identify tissue regions on the slide to be scanned. The scan control component generates the necessary control parameters to scan only the regions of interest under the microscope optics. The focus point selection component and a focal surface determination component ensure that the scan component captures a high-quality montage image, by enabling accurate focus control of the optical elements without requiring the stage to be stopped and refocused at each tile location, substantially reducing the acquisition time.

One step in processing the thumbnail image consists of flat-field correcting the macroscopic thumbnail image using a similar image that may have been obtained from the same camera and a blank slide. This removes any spatial light anomalies from the thumbnail image, which may reduce the efficiency of the tissue finding component. Depending upon the format, or size, of the camera and the aspect ratio of the slide, a portion of the image may contain non-slide objects such as a slide carrier (not shown in the figures). To remove these features, the thumbnail image may be cropped to remove non-slide objects, thus retaining only the slide information.

The image cropping may be accomplished via a two-pass process. The first pass in such a process determines an approximate location of the slide boundary, and the second pass fine-tunes this estimate. The search for the boundary is conducted over upper and lower intervals corresponding to the regions expected to contain the upper and lower slide edges, respectively. The slide or region of interest may be assumed to be positioned near the center, vertically, in the thumbnail image. The portion of the image falling outside of the identified slide boundary is removed. It should be noted that the cropping component and each of the other components described herein may operate on either a grayscale or color image. The image may also be cropped at the estimated edge locations, and then uniformly reduced in size to produce a small thumbnail image of the slide for rapid, visual slide identification.

Because the slide may not be oriented perfectly horizontally in the original thumbnail image, the identified slide edges are likely to lie at an angle. Thus, even after cropping, there may be remnants of the slide edges or cover slip in the cropped image. Therefore, the image cropping component attempts to identify pixel blocks that likely contain these remaining edges and flags these blocks as edges that will not be considered for high resolution imaging by the tissue finding component.

The resulting cropped image generated by the image cropping component may serve as an input to the tissue finding component. This component locates regions in the thumbnail image that contain tissue of interest to a specialist. In order to minimize the time and storage space required to accomplish high-resolution slide imaging, the inventive system may capture only those regions of the slide that contain tissue. This approach may be facilitated by identifying regions containing tissue in the thumbnail image.

The tissue finding component identifies tissue regions via a sequence of filters that incorporate knowledge of the typical appearance and location of tissue and non-tissue slide regions. Initial filtering steps, in one embodiment, convert the image to a grayscale image and analyze the mean and standard deviation of the local pixel intensities. Pixel mean intensities may be used to differentiate tissue-containing regions from blank and other non-tissue regions, such as those containing the slide label or other markings. The standard deviation data may represent the amount of variation in pixel intensity values and thus is a good indicator of the border between tissue and the blank slide. The mean and standard deviation data is combined to generate a threshold value that is used to make an initial classification of tissue versus non-tissue. Subsequently, morphological filters may be applied to refine the classification based on the size and position of neighboring groups of potential tissue pixels.

The embodiment described above uses the mean and standard deviation of the local pixels as the basis for detecting regions of interest. One skilled in the art will recognize, however, that other image characteristics can also be used to identify the specimen from non-items of interest such as dust and scratches. That embodiment may also process a grayscale macroscopic image. It should be noted, however, that the pixel intensity differentiation tools described herein can be applied to each of the color components (traditionally, red, green and blue) of a color image in addition to being applied to a grayscale image. Additional processing tools can also be applied between color components to refine the tissue finding accuracy and to remove features such as labels and writing that are not critical to the application, or to select user defined areas of interest to be scanned, such as regions circled by a purple marker.

The filters, which comprise the tissue finding component, process the pixels of the cropped grayscale thumbnail image in groups that correspond to slide regions, or tiles, that can be imaged individually during the high-resolution scanning process. These filters ensure that tiles only partially filled with tissue are classified as tissue-containing tiles. The final output of the filter sequence is a tiling matrix, the value of which indicates which tiles should be imaged. The tiling matrix subsequently guides the high-resolution scanning process.

Figure 2:
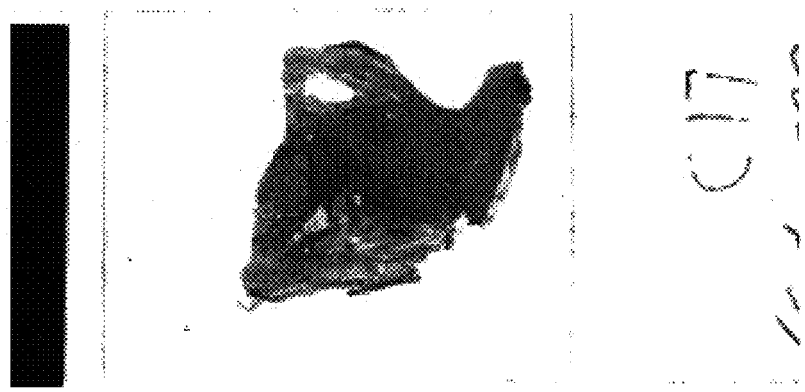
FIG. 2 is a macroscopic image resulting from operation of an embodiment of the cropping component.
Figure 3:
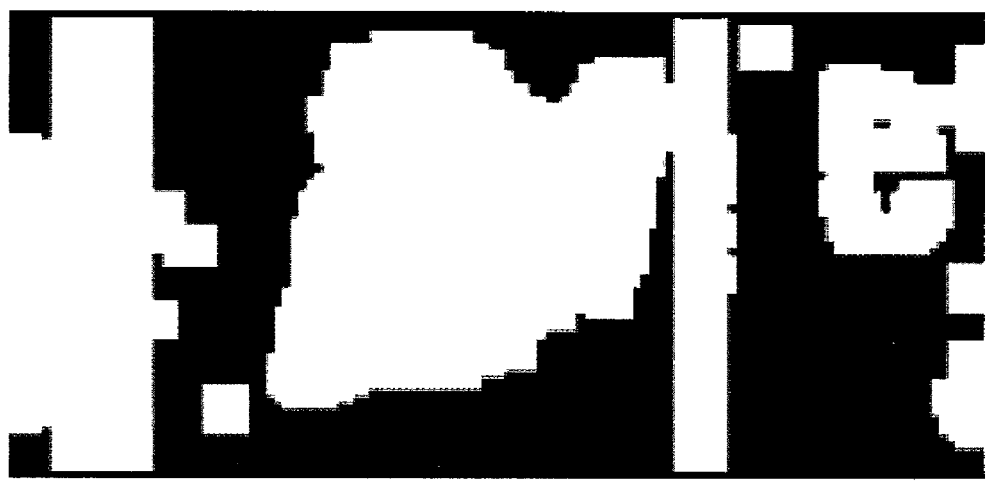
FIG. 3 illustrates a result of the tissue finding component.
Figure 4:
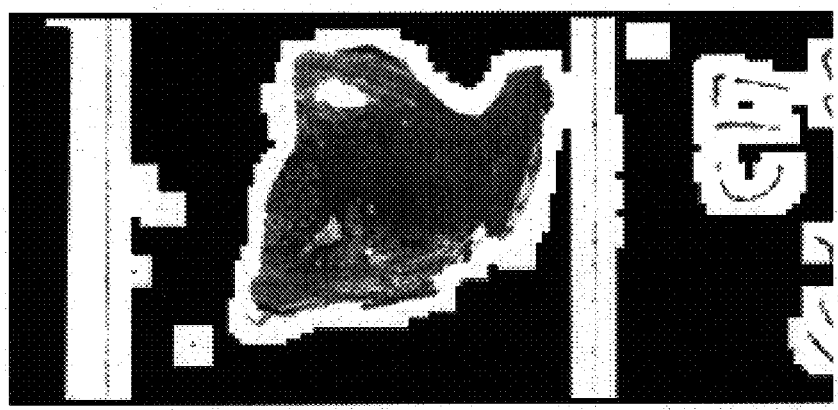
FIG. 4 is an overlay of FIGS. 2 and 3 illustrating the regions of the slide to be imaged.

An example of the image cropping and tissue finding processes are shown in FIGS. 2, 3 and 4. FIG. 2 illustrates the macroscopic image after flat-field correction and image cropping. FIG. 3 illustrates the results of the tissue finding component. The resulting tile matrix shown in FIG. 3 has a one-to-one correspondence to the field of view of the microscopic camera. White pixels (binary 1) signify fields to be captured and imaged, and black pixels represent regions not to image. FIG. 4 illustrates an overlay of FIGS. 2 and 3 representing the sections of the slide to be imaged. For the application depicted in FIGS. 2–4 (anatomical pathology), it is imperative to image all suspect regions that may contain tissue so conservative criteria are used in the tissue finding component, resulting in cover slip edges and writing etched into the slide to be identified as to be imaged. The savings in the acquisition time is represented by the ratio of the white to black areas of FIG. 3. For this image, only 53% of the slide region is to be imaged, including the label and cover slip edges, and etched writing on the slide.

At the completion of the tissue finding component, the scan control component interprets the tissue finding tile matrix (FIG. 3) and transposes the positions into actual stage coordinates for the microscopic imaging. A program running on a host computer controls the operation by communicating with a stage controller and microscopic camera 104. Actual scanning can occur in any fashion such as by rows or columns, or in a step fashion to image neighboring areas.

To achieve good focus for an entire slide, the surface that best represents the focal position of the sample with respect to the optical elements may be determined and used to automatically control the focus as the tissue is scanned under the microscope optics. These steps may furthermore be completed under the focus point selection component and the focus surface determination component.

In one embodiment, the focus point selection component evaluates the tissue regions of the thumbnail image and selects several points on which to initially focus the microscope optics. In this embodiment, that focus point selection is based on pixel intensity and distribution. Initially, tissue containing pixels or groups of tissue containing pixels are considered. Those pixels or pixel groups will be referred to hereinafter as regions. The regions that will be focussed upon, or focus regions, are then selected based on the relative contrast between the intensity of those regions within the thumbnail image and the distribution of those regions within the tissue containing portions of the image. It will be recognized that other intensity and/or distribution selection criterion may be utilized to select focus regions. After the focus regions are identified, a normalized focus surface such as a plane or curve may be drawn through the focus points and an equation, model, curve, or other method for describing appropriate focal lengths along that surface can be obtained. Proper focus for each region to be captured by the high-resolution scan may then be calculated by focusing on, for example, the plane or curved surface.

Selecting the appropriate focus region based on relative contrast improves the likelihood that regions that contain tissue will be selected over a method of picking focus regions based on a pre-selected grid-pattern. Selecting regions based on their overall distribution with respect to the tissue coverage area provides assurance that the resulting plane or surface will be representative of the entire slide and not limited to a small portion of the tissue, as could occur if selection were based solely on the relative contrast of pixels.

To select focus regions based on contrast, the present invention may select a number of focus regions having a desired contrast quality. For example, six to ten of the darkest regions may be selected from a back-lit image under the assumption that dark regions contain a large amount of tissue.

Distribution refers to the overall distribution of regions with respect to the tissue coverage area. Because a surface defined by the focus regions is the basis for maintaining the focus across the entire specimen during scanning, it is beneficial to have focus regions dispersed across the specimen rather than being grouped in close proximity to one another in one or more areas of the specimen. In that way, every point to be scanned will be close to a focus point. Thus, the scanned optical position at each point, as defined by the surface, should be very nearly the optimum in-focus position for that point.

The focus point selection component may, for example, assure that at least one focus point is located within each of a number of pre-selected areas of the tissue. Those areas may, for example, be separate pieces of tissue on a slide. If a focus point does not exist on each pre-selected area, the focus point selection component may select additional regions, for example, having the desired contrast quality, until at least one focus point is identified on each pre-selected area. The number of data points required will depend on the actual three-dimensional structure defined by the specimen and slide, and the geometrical dimension of the surface to be fit. Once the surface has been determined, an error function can be calculated to determine the fit accuracy. For example, the mean square error of each selected focal region may be calculated to determine how much error exists between the surface fit and each focus region. If that error is greater than a predetermined acceptable error level, at one or more points, additional data points may be added to the calculation and/or points that have large errors may be eliminated and the surface may be recalculated under the assumption that the points having excessive errors were anomalies. A surface may then be fitted to those points to define a focal surface to be utilized when scanning the tissue.

In alternative embodiments, the focus points are either user definable through an input file or through a suitable user interface. In addition, for cases where the specimen locations are reproducible on the slides, the focus points can be predefined and repeated for each slide without the use of a macroscopic image or any preprocessing to find the tissue regions.

Once selected, each focus position is placed under the microscope optics in the focal surface determination component, and an auto-focus program determines the best-fit focus at each position. This generates a three-dimensional data set corresponding to the optimal specimen distance at each stage location. These data points are used as input to a surface fitting routine that generates the necessary control parameters for the slide scanning process.

At the completion of the focus point selection, the tissue information and the surface parameters are passed to the scan control component. This component is responsible for the motion of the stage and synchronization of the microscopic imaging system during montage image acquisition. To achieve accurate, well-aligned tiled images, the specimen must be positioned such that each camera image is aligned within the equivalent single pixel spacing in real or stage space (camera pixel size divided by the overall optical magnification). This usually entails a stage step of $\delta x$ and $\delta y$ where each step is directly related to the effective pixel size, which may be expressed in terms of camera pixel size/optical magnification, and the number of image pixels in the x and y directions respectively. For example, a 1300×1030 pixel, 10 µm square pixel camera operated at 20× magnification results in $\delta x$=10 µm*1300/20=650 µm and $\delta y$=10 µm*1030/20=515 µm. To maintain focus during the scanning process, the stage must be positioned at the proper focal position as determined by the focus surface parameters: $z_{ij}=f(x_i, y_j)$, where $z_{ij}$ is the vertical position of the slide with respect to the optical components, $f(x_i, y_j)$ is the function used to represent the best focus surface, and $x_i$ and $y_j$ are the positions of each camera image in the x and y axes, respectively. The camera image positions can be expressed as linear relations between the starting position of the stage ($x_o$ and $y_o$) and the step size associated with each image dimension:

$$x_i=x_o+i*\delta x \text{ and } y_j=y_o+i*\delta y.$$

Image montage scanning is traditionally accomplished by either scanning by rows or columns. Assuming that tiling is completed by scanning across a row in the x-direction and stepping vertically in the y-direction after each row has been scanned, the stage is simply positioned at the appropriate position given by $z_{i,j}=f(x_i, y_j)$. Thereafter, the stage is stopped and an image is acquired. If imaging is accomplished during continuous motion of the stage in the x-direction via a line scan camera or alternative imaging arrangement, the vertical velocity as a function of focal position $x_i$ and time, can be computed from the partial derivative of the focal surface: $V_z(v_x, y_j)=\delta f(x_i, y_j)/\delta x*v_x$, where $V_z$ is the velocity of the vertical position of the stage and $v_x$ is the velocity in the x-direction. The velocity of the vertical position of the stage can be used to control the optical position and maintain focus as images are acquired continuously across the row.

Figure 5:
FIG. 5 illustrates a result of the focus point selection component on a sample image.

FIG. 5 represents the results of the focus point selection component. This figure shows the thumbnail or macroscopic image of the region to be scanned. The light spots 504 overlaid on the specimen 506 represent the positions selected by the focus point selection component. These positions are placed under the microscope and auto-focused on each location. FIG. 6 illustrates the three-dimensional data set generated by focussing on each of the focus points of the specimen depicted in FIG. 5. For this slide, the best fit was planar, $z(x,y)=dz/dx \; x+dz/dy \; y+z0$, where dz/dx (dz/dy) is the slope or pitch of the plane with respect to x-axis (y-axis) and z0 is the vertical offset of the plane with respect to the z-axis. The best fit parameters for the specimen of FIG. 5 are also shown in FIG. 6.

At the completion of the pre-scan processing, the tile matrix and the stage control parameters are passed to a scanning-process control program. The scanning process control program controls the operation by communicating with a stage controller, a stage position sensor, a camera and the strobe firing circuitry. In the invention, the computer program controls the operation of stage 102, camera 104 and strobe 108 illumination. The actual slide scanning can be automated to image entire slides, image only a portion of the slide or use a user-interface to allow the user to select the regions to be imaged. Once a region has been selected for imaging, the program then controls the operation by communicating with a stage controller, a stage position sensor, camera 104 and strobe firing circuitry 108. Preferably, tiling is performed by moving stepwise along the short axis and with continuous motion along the long axis. In other words, tiling is done one row at a time. For this reason, a stage position is monitored and controlled differently along each stage axis. Along the short axis of the slide, the stage position is monitored and controlled, by the program, directly through the stage controller. Along the long axis, however, the stage position is monitored by a direct stage position sensor, which can be separate or part of the overall stage control circuitry.

In another embodiment, a Ronchi ruler attached to stage 102 is used for the stage position sensor. Those skilled in the art will recognize that any position sensor may be used in the invention. This sensor can be external to the stage controller or the positional information can be acquired directly from the stage controller with or without feedback.

For reference, a Ronchi ruler is a pattern of alternating light and dark bands, equally spaced along a substrate, typically either glass or plastic. A position sensor based on the Ronchi ruler utilizes a light sensor that is mechanically isolated from the ruler. As the ruler passes under the sensor, a series of electronic pulses is generated corresponding to the alternating light and dark bands of the ruler. These pulses can be used to monitor the position and direction of stage 102.

Based on the magnification of the optics and the camera utilized, strobe 108 is fired whenever the position sensor determines stage 102 has moved into the field of view of the next tile to be captured by the camera 104. The system continues to capture image tiles with precise alignment, until the images of all desired files have been captured or the controlling program tells the system to stop. At the end of the capture process, the slide is removed and another slide can be inserted. With current technology, the rate-limiting step for image capture utilizing the present invention is the data transfer period in the camera.

Figure 7:
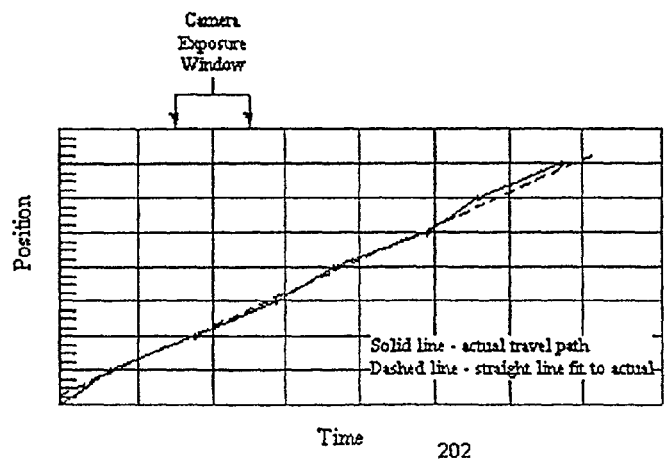
FIG. 7 is a set of charts graphically depicting steps implemented in an embodiment of the inventive system.
Figure 7:
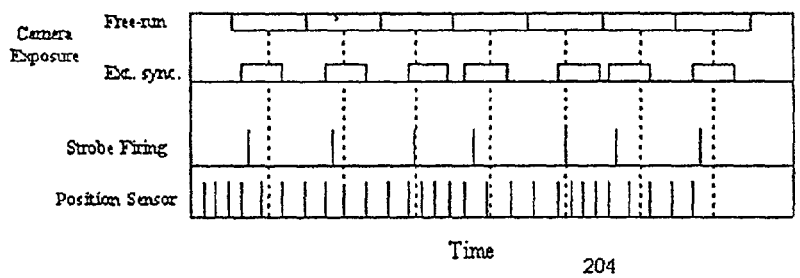
Figure 7:
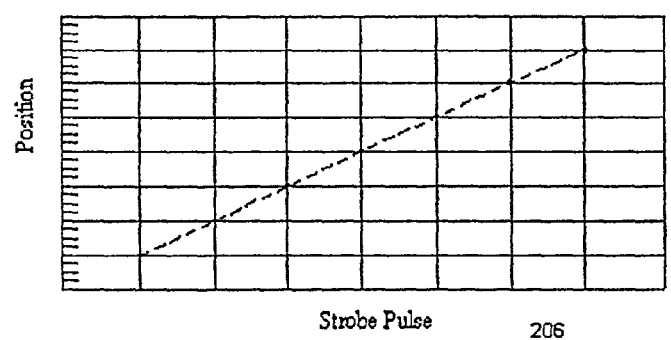

FIG. 7 illustrates the signals of camera 104, stage 102, optical position detector, and strobe 108. Note that in FIG. 7, graphs 202 and 204 the signals from the optical position detector represent motion of stage 102, so their timing will vary depending on the speed of the stage movement. Where the system is triggered by the location of stage 102 as reported by the optical position sensor, precise movement of the stage movement is not necessary, allowing for the use of low cost stages 102.

The system can be run in a variety of modes, depending on how the camera is controlled. In one embodiment, the stage location, as sensed by a position sensor, fires both the camera 104 and the strobe 108 as indicated by the two traces at 204. In an alternate embodiment, camera 104 is free running and only strobe 108 is fired by stage position as indicated by a single trace at 204. This mode does not depend on uniform motion of stage 102 over the area imaged, because the strobe pulse is much shorter than the integration time of the camera 104, wherein the integration time is a time during which the camera is receiving an image. As long as the correct stage position is reached anytime within the integration time of camera 104, an excellent, well aligned image results.

Firing strobe 108 based on direct position information differs from the more traditional application of strobe photography. In traditional strobe photography, a strobe and camera are synchronized in time, and positional information regarding the objects being imaged can be inferred from the relative position within the image. When the present invention is operated in a mode wherein the position feedback controls both camera 104 and strobe 108, and camera 104 is not free running, each camera frame corresponds to an equally spaced positional change, independent of the stage velocity (speed and time variations in the speed). In the case that camera 104 is free running, the stage speed has to be matched to the camera frame rate only to the accuracy such that the strobe pulse does not fall outside the exposure window. The relative time within the exposure window is irrelevant.

As will be understood by one skilled in the art, while the present invention describes a microscopic optical arrangement, the invention can also be applied to other optical imaging, inspection and illumination systems that are used for building up an image by matching the stage speed with the camera speed.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. An imaging apparatus, comprising:
   a motorized stage;
   a camera having a lens directed toward said motorized stage; and
   a processor coupled to said camera, wherein said processor contains instructions which, when executed by said processor, cause said processor to:
   select at least three points of a sample adjacent said motorized stage;
   determine a stage position for each selected point;
   focus said camera on each selected point;
   determine an object distance from the camera lens to the sample at each selected point;
   develop a focus surface based on stage position and object distance for the at least three selected points;
   determine for a selected point whether an error function based on the difference between the object distance at the selected point and the object distance of the surface at that point is greater than a predetermined limit;
   delete the point from the selection if the error is greater than the predetermined limit; and
   develop a focus surface based on stage position and object distance for the remaining selected points.

2. An imaging apparatus, comprising:
   a motorized stage;
   a camera having a lens directed toward said motorized stage; and
   a processor coupled to said camera, wherein said processor contains instructions which, when executed by said processor, cause said processor to:
   select at least three points of a sample adjacent said motorized stage;
   determine a stage position for each selected point;
   focus said camera on each selected point;
   determine an object distance from the camera lens to the sample at each selected point;
   develop a focus surface based on stage position and object distance for the at least three selected points;
   determine for a selected point whether an error function based on the difference between the object distance at the selected point and the object distance of the surface at that point is greater than a predetermined limit;
   select an additional point from an area in which the point has an error function greater than a predetermined limit;
   determine stage position for the additional selected point;
   focus said camera on the additional selected point;
   determine object distance from the camera lens to the sample at the additional selected point; and
   develop a focus surface based on stage position and object distance for the selected points.

3. A system for creating a high throughput montage image of a microscope slide, the system comprising:
- an optical system that comprises at least one camera, a motorized stage for moving a slide while an image of the slide is captured, a pulsed light illumination system that optically stops motion on the motorized stage while allowing continuous physical movement of the motorized stage, and a stage position detector that controls firing of the pulsed light illumination system at predetermined positions of the motorized stage;
- a first component that identifies sample regions on the slide in the optical system and determines locations of the sample on the slide, wherein the first component uses information about the locations to generate control parameters for the motorized stage and the camera;
- a second component that uses the control parameters to ensure that a high-quality montage image is captured; and
- means for capturing a montage image, using the second component, by maintaining motion of the motorized stage and synchronization of the optical system, thereby enabling accurate focus control of optical elements without requiring the stage to be stopped and refocused at each tile location.

4. The system of claim 3, wherein the optical system is a bright field microscope.

5. The system of claim 3, wherein the pulsed light illumination system is a standard strobe light, wherein stage location is determined by the stage position detector, wherein the stage location executes the strobe light and wherein the system does not depend on uniform motion of the motorized stage over an imaged area to execute the strobe light.

6. The system of claim 5, wherein the camera is free running and the motorized stage speed is matched to the camera's frame rate to an extent that prevents execution of the pulse light illumination system from falling outside of an exposure window.

7. The system of claim 3, wherein the pulse light illumination system is any pulsed light source.

8. The system of claim 3, wherein the stage position detector is a Ronchi ruler that is attached to the motorized stage, wherein the Ronchi ruler is a pattern of alternating light and dark bands that are equally spaced along a substrate.

9. The system of claim 8, wherein the stage position detector utilizes a light sensor that is mechanically isolated from the Ronchi ruler, wherein as the ruler passes under the sensor, a series of electronic pulses that correspond to the alternating light and dark bands of the Ronchi ruler is generated and the series of electronic pulses is used to monitor the position and direction of the motorized stage.

10. The system of claim 3, wherein the position system uses only position information from a stage controller without an external feedback sensor.

11. The system of claim 3 wherein the pulse illumination system is fired whenever the stage position detector determines that the motorized stage has moved into a neighboring field of view of the camera.

12. The system of claim 3, wherein signals from the stage position detector represent motions of the motorized stage, and wherein timing of the signals vary depending on speeds of the motorized stage.

13. The system of claim 3, wherein an absolute speed of the motorized stage is not relevant.

14. The system of claim 5, wherein a stage position as determined by the stage position detector executes the camera and the pulse light illumination system, wherein the camera is not free running and each camera frame corresponds to an equally spaced positional change that is independent of a stage velocity.

15. The system of claim 3, wherein the first component includes an image cropping component for identifying sample regions on the slide to be scanned, wherein the image cropping component:
- determines a location of a slide boundary by searching intervals corresponding to regions expected to contain edges of the slide; and
- removes portions of the image falling outside of the determined slide boundary.

16. The system of claim 15, wherein the image cropping component converts a copy of the image to a grayscale image.

17. The system of claim 15, wherein the image cropping component identifies pixel blocks that are likely to contain remaining boundary edges and flag the blocks as edges that should not be considered for high-resolution imaging.

18. The system of claim 3, wherein the first component includes a sample finding component that locates regions in the image that contain the sample of interest.

19. The system of claim 18, wherein a cropped image is inputted into the sample finding component from an image cropping component, wherein the sample finding component identifies sample regions by applying a sequence of filters that incorporate knowledge of typical appearance and location of sample and non-sample slide regions and outputs a matrix having values that indicate which regions should be imaged.

20. The system of claim 3, wherein a filter analyzes mean pixel intensity to generate a threshold value for making an initial classification of sample versus non-sample regions.

21. The system of claim 3, wherein a filter analyzes a difference between pixel intensities to generate a threshold value for making a classification of sample versus non-sample regions.

22. The system of claim 3, wherein a filter analyzes mean and standard deviation of local pixel intensities and combines the mean and the standard deviation to generate a threshold value for making a classification of sample versus non-sample regions.

23. The system of claim 3, wherein the intensities are used to differentiate sample-containing regions from blank regions and other non-sample containing regions and the standard deviation represents the amount of variation in pixel values and is therefore an indicator of the border between the sample and the blank slide.

24. The system of claim 3, wherein morphological filters are applied to an array representing selected and unselected regions which in turn represent sample and non-sample regions to refine classification based on size and position of neighboring groups of potential sample pixels, wherein the morphological filters process pixels of the image in groups that correspond to slide regions that can be imaged individually during a high-resolution scanning process.

25. The system of claim 24, wherein the morphological filters ensure that tiles that are partially filled with the sample are classified as sample-containing tiles.

26. The system of claim 3, wherein the first component includes a scan control component that interprets a matrix, outputted by a sample finding component, and transposes positions of the matrix into actual stage coordinates for a microscopic imaging.

27. The system of claim 3, wherein the second component comprises:

a focus point selection component that evaluates sample regions of an image and selects several points on which to initially focus microscope optics on a point-by-point basis;

a focal surface determination component that uses focus positions to generate a three-dimensional data set corresponding to optical specimen distance at each stage location, wherein data points in the data set are input to a routine that generates control parameters for a slide scanning process; and a scan component that captures the montage image by maintaining motion of a stage and synchronization of a microscopic imaging system during montage image acquisition, thereby enabling accurate focus control of optical elements without requiring stopping and refocusing of the stage at each tile location and substantially reducing montage acquisition time.

28. The system of claim 27, wherein the focus point selection component selects positions based on their relative contrast within the image and their overall distribution with respect to a sample coverage area.

29. The system of claim 27, wherein focus points are definable through an input file.

30. The system of claim 27, wherein focus points are definable through a user interface.

31. The system of claim 27, wherein focus points are predefined and repeated for each slide without any preprocessing to find sample regions, when sample locations are reproducible on the slides.

32. The system of claim 27, wherein the number of data points required depends on the actual three-dimensional structure defined by the specimen and the slide and the geometrical dimension of the surface to be fit.

33. The system of claim 32, wherein once the surface is determined, an error function is calculated to determine a fit accuracy, and wherein if the accuracy indicated by the error function exceeds expected limits, additional points can be acquired and the surface recalculated.

34. The system of claim 27, wherein the specimen is positioned such that each camera image is aligned within the equivalent single pixel spacing.

35. The system of claim 27, wherein to maintain focus during the scanning process, the stage is positioned at a proper focal position as determined by the focus surface parameters.

36. A method for creating a high throughput montage image of microscope slides, the method comprising:
    placing a slide to be imaged in a slide holder on a motorized stage;
    capturing a low resolution image of the slide;
    identifying sample locations within the image;
    generating control parameters to scan regions of interest under microscopic optics;
    capturing a high resolution montage image by enabling accurate focus control of optical elements without requiring that the motorized stage be stopped and refocused at each tile location in the montage image;
    controlling a tiling process by moving the motorized stage;
    capturing image tiles with precise alignment by executing a strobe illumination system whenever a stage position sensor determines that the motorized stage has moved to a neighboring field of view of a camera;
    scanning each row of locations identified to contain the sample for the sample; and
    removing the slide and inserting another slide to be imaged.

37. The method of claim 36, wherein identifying further comprises:
    flat field correcting the image using a blank slide and a similar image obtained from a camera that captured the image;
    cropping the image by an image cropping component;
    inputting a cropped image into a sample finding component, wherein the sample finding component identifies sample regions by applying a sequence of filters that incorporate knowledge of typical appearance and location of sample and non-sample slide regions and outputs a tiling matrix whose values indicate which tiles should be imaged; and
    interpreting the tiling matrix, by a scan control component, and transposing positions of the tiling matrix into an actual stage coordinate for a microscopic imaging.

38. The method of claim 36, wherein generating further comprises:
    evaluating sample regions of the low resolution image and selecting several focus positions on which to initially focus microscope optics on a point-by-point bases;
    placing under the microscope optics each focus position, wherein the best-fit focus at each position is determined;
    generating a three-dimensional data set corresponding to an optimal sample distance at each stage location, wherein data points in the data set are input to a routine that generates necessary control parameters for a slide scanning process; and
    passing the sample information and control parameters to a component that is responsible for the motion of a stage and synchronization of a microscopic imaging system during a montage image acquisition.

39. The method of claim 38, further comprising determining a surface on the slide that represents a focal position of the sample and using information from the surface to automatically control focus as the sample is scanned under microscope optics.

40. The method of claim 38, wherein evaluating further comprises selecting positions based on their relative contrast within the low resolution image and their overall distribution with respect to a sample coverage area.

41. The method of claim 38, wherein evaluating further comprises allowing a user to define focus points.

42. The method of claim 38, wherein generating the number of data points required depends on the actual three-dimensional structure defined by the sample and the slide and the geometrical dimension of the surface to be fit, wherein an error function is calculated to determine a fit accuracy once the surface has been determined, and if the accuracy exceeds expected limits additional points can be acquired and the surface recalculated.

43. The method of claim 38, further comprising positioning the sample such that each camera image is aligned with the equivalent single pixel spacing.

44. The method of claim 38, further comprising positioning the stage at a proper focal position as determined by focus surface parameters.

45. The method of claim 38, further comprising computing a vertical velocity, as a function of a parameter and subsequently of time, from the derivative of the focal surface if imaging is accomplished during continuous motion of the stage in a x-direction via an imaging arrangement.

46. The method of claim 45, further comprising using the velocity to control the optical position and maintain focus as images are acquired continuously across a row.

47. The method of claim 45, further comprising requiring a new velocity function for each row scanned based on a stepped y-position.

48. The method of claim 37, wherein cropping further comprises the steps of:
determining an approximate location of a slide boundary by searching intervals corresponding to regions expected to contain edges of the slide; and removing portions of the image falling outside of the determined slide boundary.

49. The method of claim 48, further comprising converting a copy of the low resolution image to a grayscale image.

50. The method of claim 48, further comprising identifying pixel blocks that are likely to contain remaining boundary edges and flagging these blocks as edges that should not be considered for high resolution imaging.

51. The method of claim 48, further comprising analyzing mean and standard deviation of local pixel intensities and combining the mean and the standard deviation to generate a threshold value.

52. The method of claim 51, further comprising using the intensities to differentiate sample-containing regions from blank regions and other non-sample containing regions.

53. The method of claim 48, further comprising applying morphological filters to threshold standard deviation data to refine classification based on size and position of neighboring groups of potential sample pixels, whereby the morphological filters process pixels of the cropped image in groups that correspond to slide regions that can be imaged individually during a high-resolution scanning process.

54. The method of claim 36, wherein controlling comprises attaching a Ronchi ruler to the motorized stage.

55. The method of claim 54, wherein controlling further comprises utilizing a light sensor that is mechanically isolated from the Ronchi ruler, whereby as the Ronchi ruler passes under the light sensor a series of electronic pulses that corresponds to alternating light and dark bands of the Ronchi ruler is generated.

56. The method of claim 36, wherein capturing further comprises capturing images of tiles with precise alignment until a row is finished.

57. The method of claim 36, wherein capturing further comprises capturing images of tiles with precise alignment until a controlling program tells the system to stop.

58. The imaging apparatus of claim 1, wherein the processor further deselects the point having an error function greater than the predetermined limit.

\* \* \* \* \*